(12) United States Patent
Ray et al.

(10) Patent No.: US 10,656,084 B2
(45) Date of Patent: May 19, 2020

(54) SYSTEM AND METHOD FOR MEASURING CLOUD PARAMETERS

(71) Applicant: Rosemount Aerospace Inc., Burnsville, MN (US)

(72) Inventors: Mark Ray, Burnsville, MN (US); Kaare Josef Anderson, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 28 days.

(21) Appl. No.: 16/008,833

(22) Filed: Jun. 14, 2018

(65) Prior Publication Data

US 2019/0383735 A1 Dec. 19, 2019

(51) Int. Cl.
*G01N 21/47* (2006.01)
*G01W 1/00* (2006.01)

(52) U.S. Cl.
CPC .............. *G01N 21/47* (2013.01); *G01W 1/00* (2013.01); *G01N 2021/4792* (2013.01)

(58) Field of Classification Search
None
See application file for complete search history.

(56) References Cited

U.S. PATENT DOCUMENTS

| | | | |
|---|---|---|---|
| 6,091,335 A | 7/2000 | Breda et al. | |
| 7,370,525 B1 | 5/2008 | Zhao et al. | |
| 7,580,127 B1 * | 8/2009 | Mayor | G01N 21/21 356/337 |
| 7,786,438 B1 | 8/2010 | DeVilbiss et al. | |
| 7,986,408 B2 | 7/2011 | Ray et al. | |
| 8,144,325 B2 * | 3/2012 | Ray | B64D 15/20 356/342 |
| 9,116,243 B1 * | 8/2015 | Brown | G01S 17/95 |
| 9,304,081 B2 | 4/2016 | Renno | |
| 9,658,337 B2 | 5/2017 | Ray et al. | |
| 9,924,138 B1 | 3/2018 | Brown | |

(Continued)

FOREIGN PATENT DOCUMENTS

| | | |
|---|---|---|
| CN | 106443709 A | 2/2017 |
| EP | 1879044 A1 | 1/2008 |
| EP | 3273269 A1 | 1/2018 |

OTHER PUBLICATIONS

Extended European Search Report dated Nov. 11, 2019, for corresponding European Application No. 19180002.

*Primary Examiner* — Shawn Decenzo
(74) *Attorney, Agent, or Firm* — Kinney & Lange, P.A.

(57) ABSTRACT

Apparatus and associated methods relate to reliably determining both size of large water droplets and density of small water droplets in a multi-modal cloud atmosphere. A pulsed beam of light is projected into the cloud atmosphere and a receiver receives a reflected portion of the projected pulsed beam backscattered by the cloud atmosphere. The received reflected portion is split into first and second parts. First and second parts are directed to first and second detectors, each having a different gain. A ratio of the gains of the first and second detector is greater than 3:1, thereby providing a low-gain detector for producing unsaturated signals indicative of scintillation spike reflection by large water particles and a simultaneous high-gain detector for producing signals indicative of range-resolved reflections by numerous small water particles.

18 Claims, 4 Drawing Sheets

(56) References Cited

U.S. PATENT DOCUMENTS

| | | |
|---|---|---|
| 2016/0274017 A1 | 9/2016 | Bencic et al. |
| 2017/0212219 A1 | 7/2017 | Spuler |
| 2017/0268993 A1* | 9/2017 | Anderson ............... G01W 1/00 |
| 2019/0107496 A1* | 4/2019 | Fan .................... G01N 15/1456 |

* cited by examiner

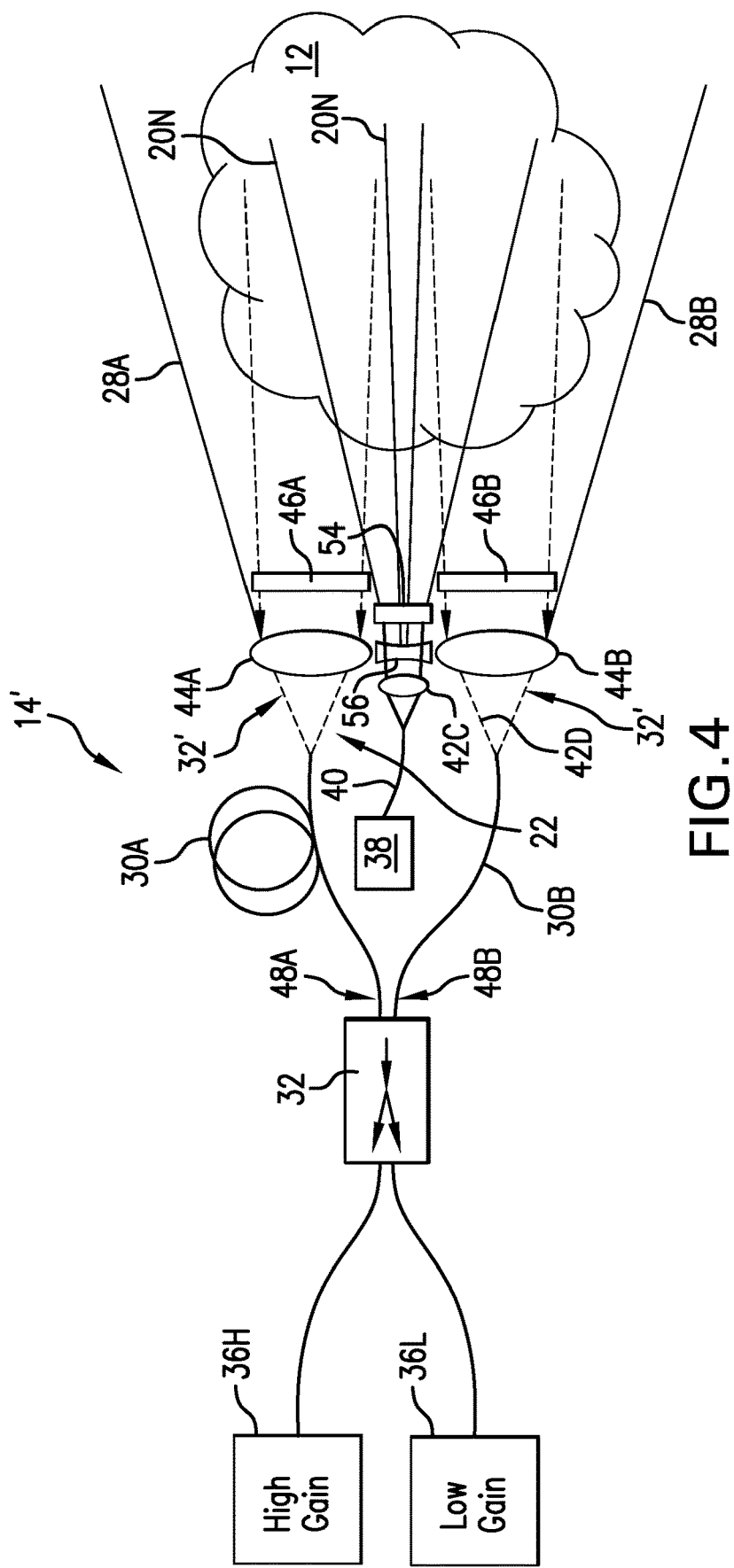

SYSTEM AND METHOD FOR MEASURING CLOUD PARAMETERS

BACKGROUND

Various cloud conditions can present risks to aircraft when traveling through them. If the temperature of a cloud atmosphere is below the freezing point for water, water droplets can become super-cooled liquid droplets. These super-cooled liquid droplets can then undergo a liquid-to-solid phase change upon impact with an aircraft surface. Ice accretes at different surface regions for different sizes of the super-cooled liquid droplets in the cloud atmosphere. Thus, characterizing the sizes of super-cooled water droplets in a cloud atmosphere can facilitate prediction of surface regions where ice will accrete as well as providing alerts of potentially dangerous conditions to a pilot.

Super-cooled small water droplets tend to form ice only on leading edges of an aircraft's exterior surface. Super-cooled Large water Droplets (SLDs), however, can strike the leading edge of a wing and run back past the icing protection systems, or can traverse airflow vectors and strike surfaces aft of these leading edges. Ice that forms on unprotected surface regions can severely alter the aerodynamics of the aircraft. Such ice accretion may cause aircraft stall or result in unpredictable aircraft control variation that might lead to flight issues. When in a cloud, ice can form on control surfaces and/or lift surfaces.

Not every cloud, however, has a significant SLD population. Different clouds and different atmospheric conditions may be accompanied by various water droplet size distributions, different ice/liquid ratios, etc., some of which may be entirely safe to an aircraft, while others may not be safe. Such water droplet size distributions and ice/liquid ratios may be measured as cloud metrics using various types of instruments.

Some aircraft are equipped with Light Detection and Ranging (LIDAR) systems to measure cloud metrics. Such systems can characterize clouds that have water droplets that have a size distribution having a single mode. Either the mean droplet size or the mode droplet size can be calculated by inversion of a backscatter signal using such systems. These systems can also calculate the density of water droplets for such mono-modal distributions.

Multi-modal distributions of water droplet sizes, however, can be difficult to characterize. Such multi-modal distributions may occur, for example, when cumulus clouds drop drizzle or rain into a lower stratiform cloud deck, creating icing conditions. For droplet size distributions having a dominant mode and a secondary mode (e.g. large concentration of relatively small water droplets plus a small concentration of large water droplets), it can be difficult to detect the anomalous amounts of large water droplets in the secondary mode.

LIDAR systems project pulses of a collimated laser beam into the cloud atmosphere and then sense the signal backscattered by the cloud atmosphere. The collimated laser beam samples a relatively small volume of the cloud, due to the collimated beam having a small field of view (e.g., 4 mrad of divergence is not atypical). Sampling such a small cloud volume can result in the beam encountering few, if any of the SLDs of a secondary distribution.

Depending on the size and density of the SLDs in the secondary distribution, the backscatter signal can appear as scintillation spikes superimposed on an otherwise smooth continuous range-resolved backscatter signal characteristic of the primary distribution. The size and frequency of occurrence of the scintillation spikes depends on the sizes and concentrations of the SLDs and on the volume of space probed by the collimated laser beam.

The continuous range-resolved backscatter signal can result from an aggregation of numerous small-magnitude reflections of light projected into the cloud formation. This aggregation of numerous backscattering events can result in the generally smooth continuous time varying signal characteristic of the primary distribution of the numerous small water droplets.

Unlike the smooth range-resolved backscatter signal from the primary distribution, backscatter signals from small concentrations of large droplet can have randomly occurring scintillation spikes. Such scintillation spikes can result from large-magnitude short-duration reflections of light projected into the cloud formation. Such large-magnitude spikes can cause detectors in the LIDAR systems to saturate. Saturation of such detectors can temporarily render the LIDAR system inoperative, at least until the detectors can recover from the saturation event. There is a need to reliably measure cloud parameters in multi-modal cloud formations.

SUMMARY

Apparatus and associated methods relate to a system for measuring cloud parameters. The system includes a pulsed-beam projector configured to project a pulsed-beam of polarized light into a projection volume of a cloud atmosphere. The system includes a receiver configured to receive a reflected portion of the projected pulsed beam backscattered from within the projection volume of the cloud atmosphere and to filter the received reflected portion into orthogonal polarized components. The system includes a beam splitter aligned with the orthogonal polarized components so as split each of the orthogonal polarized components into first and second parts. The system includes a first detector having a first gain, the first detector aligned with the first parts of the orthogonal polarized components and configured to generate first signals indicative of the first parts of the received reflected portion, respectively. The system also includes a second detector having a second gain, the second detector aligned with the second parts of the orthogonal polarized components and configured to generate second signals indicative of the second parts of the orthogonal polarized components, respectively. A ratio of the first and second gains of the first and second detectors, respectively, is greater than 3.

Some embodiments relate to a method for measuring cloud parameters. The method includes projecting, via a pulsed-beam projector, a pulsed-beam of polarized light into a projection volume of a cloud atmosphere. The method includes receiving, via a receiver, a reflected portion of the projected pulsed beam backscattered from within the projection volume of the cloud atmosphere. The method includes filtering, via the receiver, the received reflected portion into orthogonal polarized components. The method includes splitting, via a beam splitter aligned with the orthogonal polarized components, each of the orthogonal polarized components into first and second parts. The method includes generating, via a first detector aligned with the first parts of the orthogonal polarized components, first signals indicative of the first parts of the received reflected portion, respectively, wherein the first detector has a first gain. The method also includes generating, via a second detector aligned with the second parts of the orthogonal polarized components, second signals indicative of the second parts of the orthogonal polarized components, respectively, wherein the second detector has a second gain. A ratio of the first and second gains of the first and second detectors, respectively, is greater than 3.

Some embodiments relate to a system for measuring cloud parameters. The system includes a laser configured to generate a pulsed-beam of light. The system includes a polarizing plate aligned with the pulsed beam so as to polarize the pulsed beam. The system includes a projection lens aligned with the pulsed beam so as to refract the pulsed beam into a projection volume of a cloud atmosphere. The system includes a first receiver channel having a first detection lens aligned with the projection lens so as to receive a first reflected portion of the projected pulsed beam backscattered from within the projection volume of the cloud atmosphere. The first receiver channel has a first polarizing filter configured to transmit a parallel-polarized component of the received first reflected portion of the projected pulsed beam. The parallel-polarized component has a polarization parallel to that of the projected pulsed beam. The first receiver channel also has a first optical fiber of a first length and configured to transmit the parallel-polarized component from a first end to a second end during the first delay time corresponding to the first length. The system includes a second receiver channel having a second detection lens aligned with the projection lens so as to receive a second reflected portion of the projected pulsed beam backscattered from within the projection volume of the cloud atmosphere. The second receiver channel has a second polarizing filter configured to transmit an orthogonal-polarized component of the received second reflected portion of the projected pulsed beam. The orthogonal-polarized component has a polarization orthogonal to that of the projected pulsed beam. The second receiver channel also has a second optical fiber of a second length and configured to transmit the orthogonal-polarized component from a third end to a fourth end during a second delay time corresponding to the second length. A difference between the first and second delay times is greater than a predetermined duration. The second and fourth ends of the first and second optical fibers, respectively, are aligned so as to direct the transmitted parallel- and orthogonal-polarized components along a single pathway. The system includes a beam splitter aligned with the second and fourth ends of the first and second optical fibers so as to receive the combined parallel- and orthogonal-polarized components and further configured to split the orthogonal-polarized components directed along the single pathway into first and second parts. The system includes a first detector having a first gain and configured to generate a first signal indicative of the first part of the combined beam. The system also includes a second detector having a second gain and configured to generate a second signal indicative of the second part of the combined beam. A ratio of the first and second gains of the first and second detectors, respectively, is greater than 3.

BRIEF DESCRIPTION OF THE DRAWINGS

FIG. 4 is a schematic diagram of an embodiment of a cloud conditions measurement system that simultaneously generates both collimated and divergent pulsed beams (e.g., light beams).

DETAILED DESCRIPTION

Apparatus and associated methods relate to reliably determining both size of large water droplets and density of small water droplets in a multi-modal cloud atmosphere. A pulsed beam of light is projected into the cloud atmosphere and a receiver receives a reflected portion of the projected pulsed beam backscattered by the cloud atmosphere. The received reflected portion is split into first and second parts. First and second parts are directed to first and second detectors, each having a different gain. A ratio of the gains of the first and second detector is greater than 3:1, thereby providing a low-gain detector for producing unsaturated signals indicative of scintillation spike reflection by large water particles and a simultaneous high-gain detector for producing signals indicative of range-resolved reflections by numerous small water particles.

Figure 1:
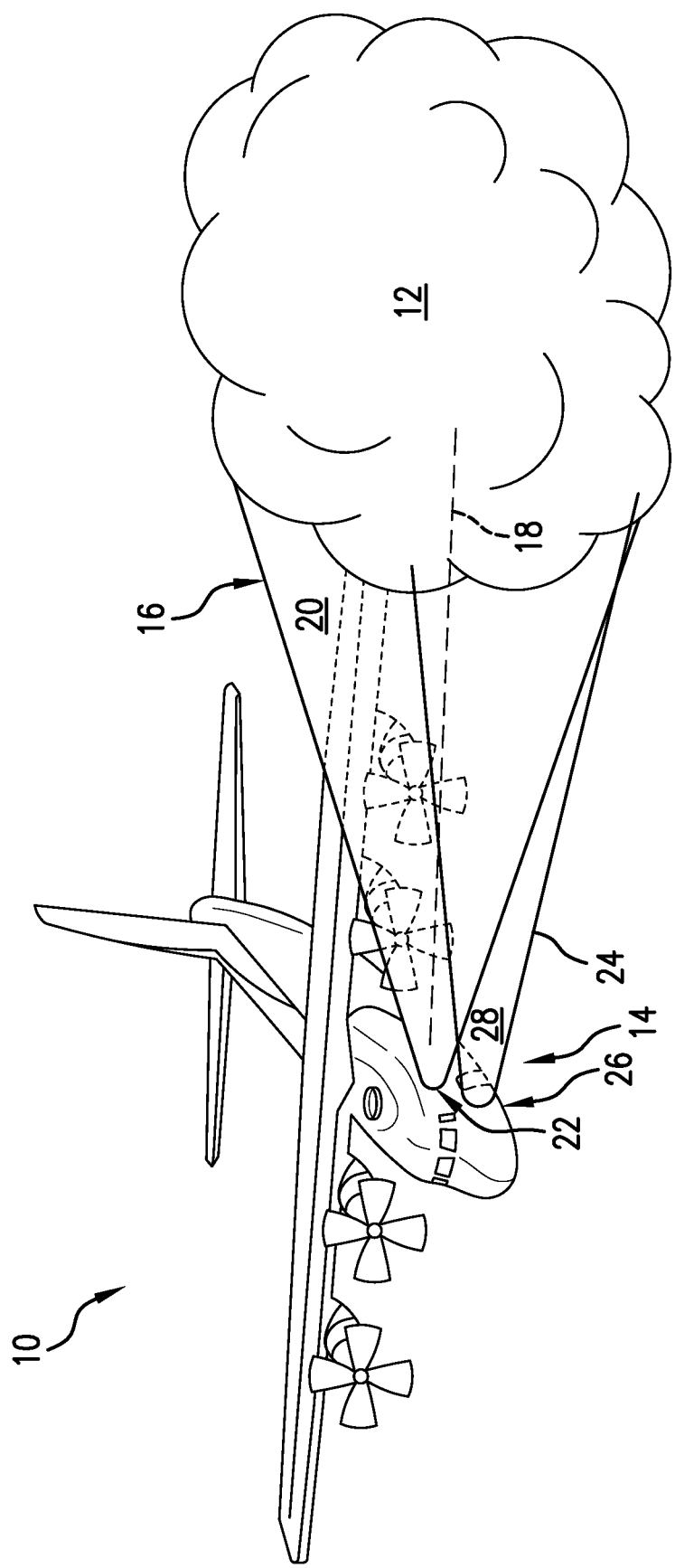
FIG. 1 is a schematic view of an aircraft using an exemplary cloud conditions measurement system for measuring cloud parameters.

FIG. 1 is a schematic view of an aircraft using an exemplary cloud conditions measurement system for measuring cloud parameters. In FIG. 1, aircraft 10 is traveling through cloud atmosphere 12. Aircraft 10 is equipped with cloud conditions measurement system 14 that is shown probing cloud atmosphere 12 by projecting pulsed beam 16 along projection axis 18 into projection volume 20 of cloud atmosphere 12. Pulsed beam 16 projects from a pulsed beam projector 22 aligned with projection axis 18. Pulsed beam 16 is then backscattered by liquid water droplets and/or ice crystals of cloud atmosphere 12. In the depicted embodiment, cloud conditions measurement system 14 is shown receiving reflected portion 24 of projected pulsed beam 16 backscattered from within projection volume 20 of cloud atmosphere 12. Cloud measurement system 14 can calculate cloud parameters based on detector signals indicative of reflected portion 24 received by cloud conditions measurement system 14.

Pulsed beam 16 can be backscattered by liquid water droplets and/or ice crystals within projection volume 20 of cloud atmosphere 12. Cloud conditions measurement system 14 includes receiver 26 aligned so as to receive reflected portion 24 of projected pulsed beam 16 backscattered from within projection volume 20 of cloud atmosphere 12. Reflected portion 24 of the pulsed beam 16 backscattered by cloud atmosphere 12 can be detected by one or more optical detectors. Thus, any light detected by the one or more optical detectors is backscattered by liquid water particles and/or ice crystals from within an intersecting space of field of view 28 of receiver 26 and projection volume 20. The one or more optical detectors can then generate an electrical signal(s) corresponding to the detected light so backscattered by cloud atmosphere 12. This generated electrical signal(s) is indicative of various metrics of cloud atmosphere 12.

The generated electrical signal(s) indicative of various cloud metrics can be marked with scintillation spikes, each occurring a time after the pulse beam is emitted. The time at which the scintillation spike occurs corresponds to the round-trip flight time it takes for the pulsed beam to travel to and from a particular large liquid water droplet, by which a portion of the pulsed beam is backscattered. Even when probing small sample volumes, many, if not most, clouds have so many small droplets distributed throughout the sampling volume that the generated backscatter signal is relatively smooth and continuous. Scintillation spikes usually result from Super-cooled Large Droplets (SLDs). SLDs are often found in clouds having a bimodal distribution, with the primary mode including numerous small liquid water droplets. In such bimodal cloud scenarios, the signal detected when sampling volumes of bimodally-distributed water droplets can have scintillation spikes superimposed upon a smooth continuous range-resolved backscatter signal. The scintillation spike portion of the backscatter signal principally results from SLD backscattering, while the smooth continuous portion of the backscatter signal results from backscattering by numerous small and densely-distributed droplets.

These scintillation signals can be large-amplitude short-time-duration signals. The amplitudes of such scintillation spikes caused by the few large water droplets can be much greater than the amplitude of the generally smooth and continuous signal caused by the primary distribution of numerous small water droplets. Thus, if the gain of the detector is configured such that the primary distribution signal uses most of the dynamic range of the detector, scintillation spikes can exceed the dynamic range of the detector, thereby saturating the detector. If, however, the gain of the detector is configured such that the scintillation spikes caused by the secondary distribution are within the dynamic range of the detector, the primary distribution signal can be small, thereby resulting in low resolution of primary signal behavior.

To accommodate both primary and secondary signal amplitudes, cloud conditions measurement system 14 includes both a high-gain signal detector and low-gain signal detector. Received reflected portion 24 backscattered from within projection volume 20 of cloud atmosphere 12 can be optically split in first and second parts, each directed to one of the high-gain and the low-gain detectors. The high-gain signal detector can be used to measure characteristics of the substantially smooth and continuous backscattered signal reflected by the numerous small water particles of the primary distribution, and the low-gain signal detector can be used to measure characteristics of scintillation spike signal reflected by large water droplets of the secondary distribution. In various embodiments, a ratio of the gains of the high-gain and low-gain detectors can be greater than 3, or 5, or 10, or 30.

Figure 2:
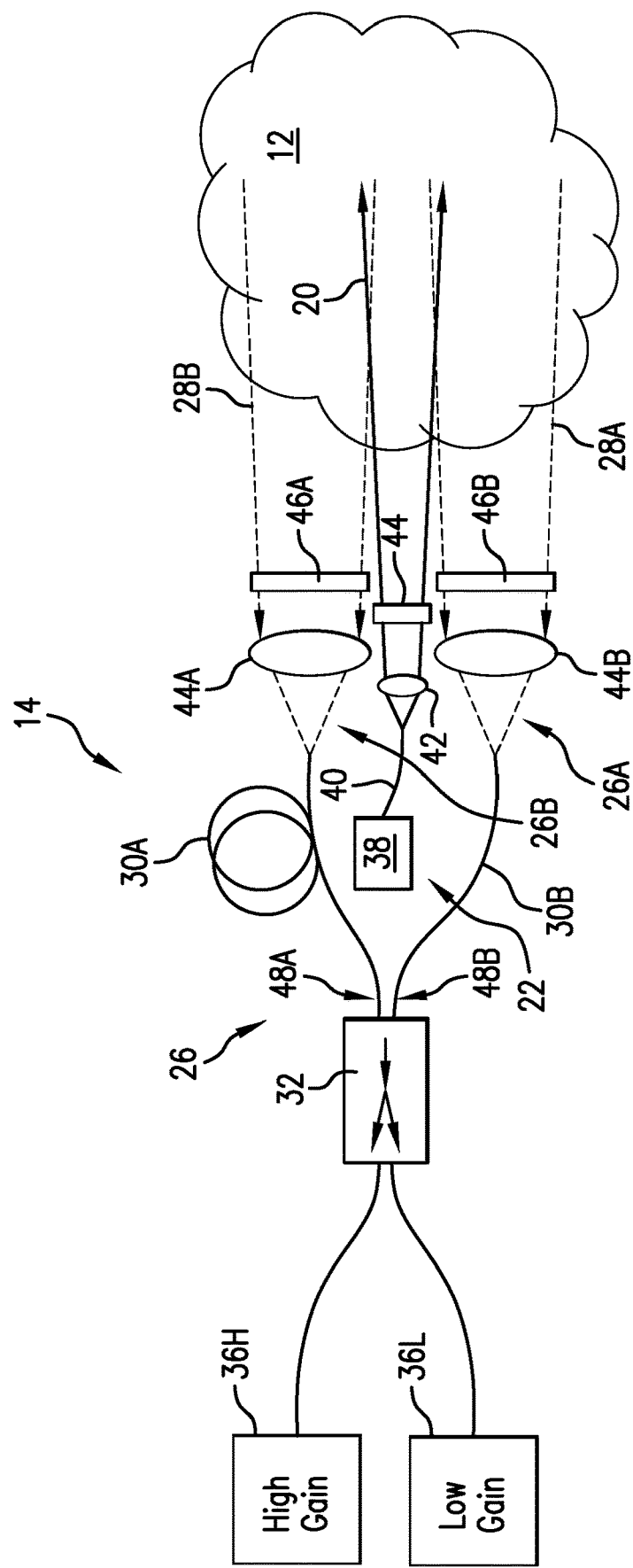
FIG. 2 is a schematic diagram of an embodiment of a cloud conditions measurement system that has both high-gain and low-gain optical detectors.

FIG. 2 is a schematic diagram of an embodiment of a cloud conditions measurement system that has both high-gain and low-gain optical detectors. In FIG. 2, cloud conditions measurement system 14 is depicted probing cloud atmosphere 12. Cloud conditions measurement system 14 includes pulsed beam projector 22, and receiver 26. Pulsed beam projector 22 includes laser 38, optical fiber 40, projection lens 42, and polarizing plate 44. Laser 38 is configured to generate the pulsed beam of light. Optical fiber 40 is configured to receive the generated pulsed beam from laser 38 and to transmit the generated pulsed beam to projection lens 42. Projection lens 42 is configured to refract the pulsed beam into projection volume 20 of cloud atmosphere 12. Polarization plate 44 is configured to polarize the projected pulsed beam. In some embodiments, polarization plate 44 is configured to circularly polarize the projected pulsed beam. In other embodiments, polarization plate 44 is configured to linearly polarize the projected pulsed beam.

Pulsed beam projector 22 is shown projecting a pulsed beam of light into projection volume 20 of cloud atmosphere 12. Pulsed beam projector 22 can be configured to project a time sequence of pulses into cloud atmosphere 12 so as to permit measurements of cloud parameters for each of the time sequence of projected pulses. In some embodiments, a period of the time sequence can be determined based on the maximum range at which reflection of the pulsed beam of light can produce a measurable signal, for example. In some embodiments, the period of the time sequence can be based on other considerations, such as, for example, specified rate of a pulsed laser, or specified update rate of cloud data measurement. In one embodiment, the pulsed beams are projected every 50 microseconds. The optical delay element can have a delay time commensurate with the specified maximum range. For example, for a specified maximum range of 40 meters, the delay time greater than the 267 nsecs that it takes for the pulsed beam to twice traverse the 40 meters—out and back again.

Receiver 26 includes orthogonal receiver channels 26A and 26B, optical delay elements 30A and 30B, beam splitter 32 and optical detectors 36H and 36L. Orthogonal receiver channels 26A and 26B include polarizing filters 46A and 46B, and detection lenses 48A and 48B, respectively. Orthogonal receiver channels 26A and 26B are aligned such that their fields of view 28A and 28B intersect projection volume 20. Typically, polarizing filters 46A and 46B are orthogonal to one another, so that the polarizations of the signals that transmit therethrough are orthogonal to one another. For example, the optical signal transmitted through polarization filter 46A can be parallel to that of the projected pulsed beam (e.g., both vertical, both horizontal, both left-hand circular, or both right-hand circular), and the optical signal transmitter through polarization filter 46B can be orthogonal to that of the projected pulsed beam (e.g., vertical vs. horizontal or left-hand circular vs. right hand circular).

The orthogonal polarized components that emerge from orthogonal receiver channels 26A and 26B are then transmitted to beam splitter 32 via optical delay elements 30A and 30B, respectively. Optical delay elements 30A and 30B are further configured to combine the orthogonal polarized components, each delayed by a delay time corresponding to the optical delay elements 30A and 30B, into a single beam. In some embodiments, the orthogonal polarized components can be combined by juxtaposing and aligning transmission ends 48A and 48B of optical delay elements 30A and 30B adjacent and parallel to one another. In some embodiments, the orthogonal polarized components can be combined by a fiber splitter formed by fusing two fibers together. Optical delay elements 30A and 30B can have delay times that are different from one another. For example, a difference between the delay times of optical delay elements 30A and 30B can be greater than a predetermined delay time. For example, the difference between the delay times of optical delay elements 30A and 30B can be equal to or greater than the time that it takes the pulsed beam to project to a predetermined range of detection. In this way, each of the orthogonal polarized components of the combined beam will be separated in time from one another, so as to be individually detectable by a detector.

Beam splitter 32 then splits the orthogonal polarized components into first and second parts. In some embodiments, beam splitter 32 can be a 50/50 fiber splitter having two outputs, each of which transmitting 50% of the combined orthogonal polarized components. In other embodiments, beam splitter 32 can include a beamsplitter cube. First parts of the orthogonal polarized components are directed to optical detector 36H, and second parts of orthogonal components are directed to optical detector 36L. Optical detectors 36H and 36L are configured to simultaneously detect first and second parts of the orthogonal polarized component of orthogonal receiver channels 26A and 26B, respectively, and then a predetermined time later (e.g., corresponding to the difference in the delay times of optical delay elements 30A and 30B) to simultaneously detect first and second parts of the polarized component of orthogonal receiver channels 26A and 26B. In this way, both orthogonal polarizations are detected by both high-gain signal detector 36H and low-gain signal detector 36L.

Figure 3A:
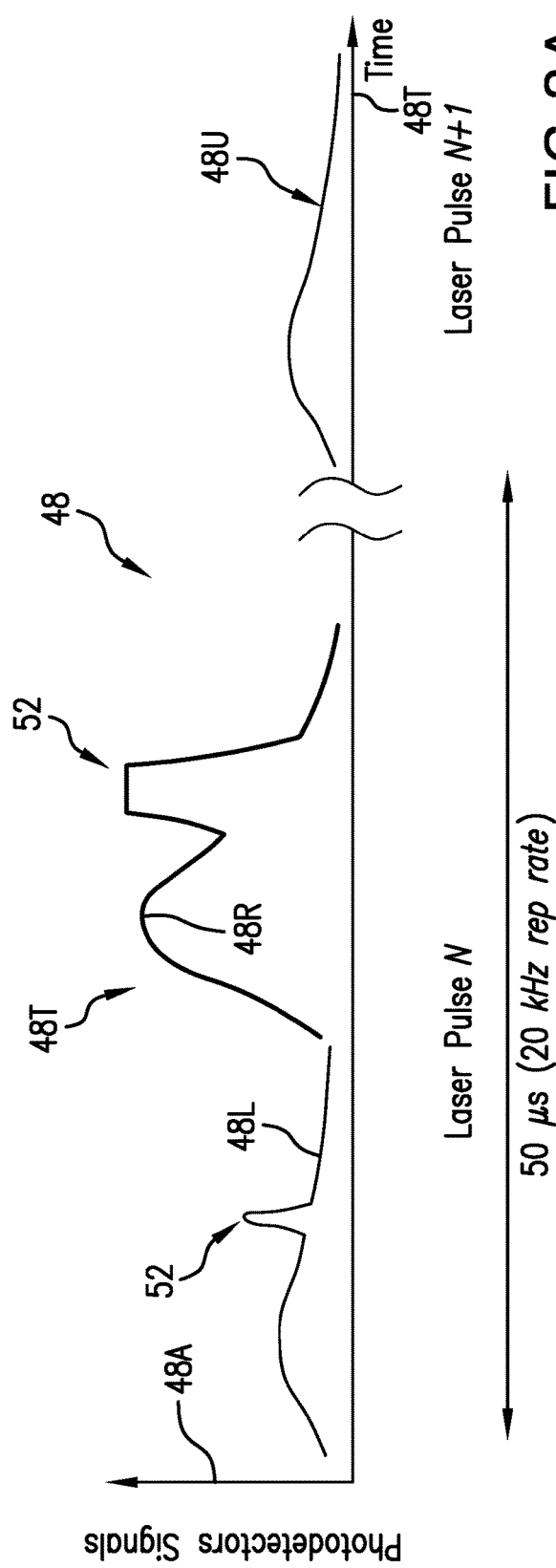
FIGS. 3A and 3B are graphs of exemplary detection signals corresponding to the high-gain signal detector and the low-gain signal detector respectively.
Figure 3B:
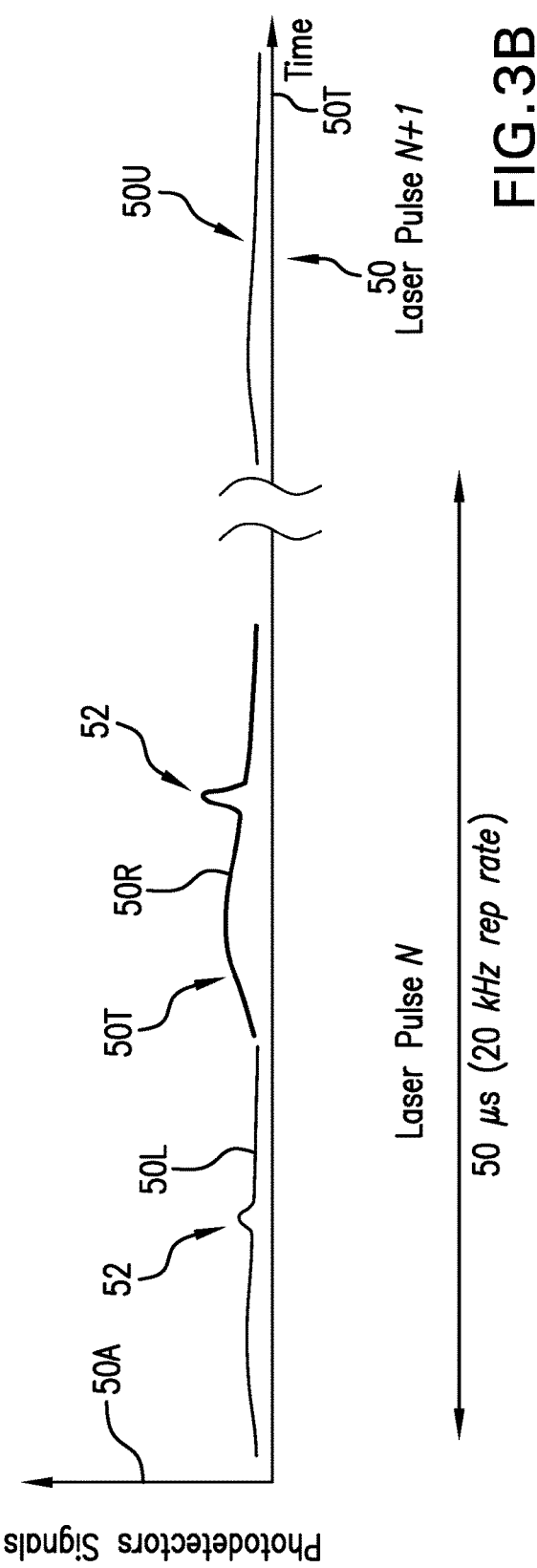

FIGS. 3A and 3B are graphs of exemplary detection signals corresponding to the high-gain signal detector and the low-gain signal detector respectively. In FIGS. 3A and 3B, graphs 48 and 50 have horizontal axes 48T and 50T and vertical axes 48A and 50A, respectively. Horizontal axes 48T and 50T are indicative of time, and vertical axes 48A and 50A are indicative of signal amplitude. Graph 48 depicts a range-resolved backscatter signals 48T that includes two range-resolved backscatter sub-signals 48R and 48L, as detected by high-gain signal detector 36H. Backscatter sub-signals 48R and 48L correspond to the first parts of orthogonal polarization components split by beam splitter 32. Backscatter sub-signal 48R is delayed by predetermined time $t_{PD}$ from backscatter sub-signal 48L. Graph 50 also includes a range-resolved backscatter signal 50T that includes two range-resolved backscatter sub-signals 50R and 50L, as detected by low-gain signal detector 36L. Backscatter sub-signals 50R and 50L correspond to the second parts of orthogonal polarization components split by beam splitter 32. Backscatter sub-signal 50R is delayed by predetermined time $t_{PD}$ from backscatter sub-signal 50L.

In some embodiments, backscatter sub-signal 48L, which precedes backscatter sub-signal 48R in time, is indicative of a right-hand circularly polarized component of the reflected signal received by orthogonal receiver channels 26A. If the projected pulsed-beam is left-hand circularly, polarized, right-hand circularly polarized backscatter signal 48R carries nearly all of reflected portion backscattered by liquid water droplets, and about half of the reflected portion backscattered by ice crystals, whereas left-hand circularly polarized backscatter signal 48L carries only half of the reflected portion backscattered by ice crystals. Thus, backscatter signal 48L typically has a smaller magnitude than backscatter signal 48R, in such a scenario. Therefore, backscatter signal 48R is more of a risk to saturate high-gain signal detector 36H than is backscatter signal 48L. Thus, delaying the polarized component orthogonal to the projected pulsed beam longer than the polarized component parallel to the projected pulsed beam permits unsaturated measurement of backscatter signal 48L, even if backscatter signal 48R will subsequently saturate high-gain signal detector 48H.

Range-resolved backscatter sub-signals 48L, 48R, 50L and 50R each depict scintillation spike 52. Only range-resolved backscatter sub-signal 48R, however, saturates high-gain signal detector 36H. In some embodiments, high-gain signal detector 36H can have a recovery time after such a saturation event before accurate signal detection can resume. After both of range-resolved backscatter signals 48T and 50T, backscattered signals 48U and 50U are generated. Backscatter signals 48U and 50U correspond to the reflected portion of the subsequent pulsed beam of the time sequence of pulses projected into cloud atmosphere 12 (shown in FIGS. 1 and 2).

FIG. 4 is a schematic diagram of an embodiment of a cloud conditions measurement system that simultaneously generates both collimated and divergent pulsed beams (e.g., light beams). In FIG. 4, cloud conditions measurement system 14' is depicted probing cloud atmosphere 12. Cloud conditions measurement system 14' includes pulsed beam projector 22', receiver 26', optical delay elements 30A and 30B, beam splitter 32 and optical detectors 36H and 36L.

Pulsed beam projector 32' includes laser 38, first optical fiber 30, collimating lens 42C (e.g., convex lens), diverging lens 42D (e.g., concave lens), and polarizing plate 44. Laser 38 is configured to generate the pulsed beam of light. Optical fiber 40 is configured to receive the generated pulsed beam from laser 38 and to divergently project the generated pulsed beam to collimating lens 42C. The collimated beam then encounters diverging lens 42D, which has central region 54 and annular outer region 56. Central region 54 is configured to pass a central portion of the collimated beam in such a manner that the central portion remains collimated and is projected along projection axis 18. Collimated pulsed beam 16C is projected in this manner into narrow-field projection volume 20N. Annular outer region 56 is configured to refract an annular outer portion of the collimated beam in such a manner so as to diverge the refracted beam in an annular fashion about projection axis 18. Divergent pulsed beam 16D is projected in this manner into wide-field projection volume 20W. Polarization plate 44 is configured to polarize the projected pulsed beams 16C and 16D. In some embodiments, polarization plate 44 is configured to circularly polarize the projected pulsed beam. In other embodiments, polarization plate 44 is configured to linearly polarize the projected pulsed beam.

Receiver 26 includes orthogonal receiver channels 26A and 26B. Orthogonal receiver channels 26A and 26B include polarizing filters 46A and 46B, and detection lenses 48A and 48B, respectively. Orthogonal receiver channels 26A and 26B are aligned such that their fields of view 28A and 28B intersect projection volumes 20N and 20W, respectively. Because the narrow-field projection volume 20N is much smaller than the wide-field projection volume 20W, field of view 28A can be much smaller than field of view 28B, as field of view 28A is configured to receive scintillation spikes backscattered within narrow-field projection volume 20N. Again, polarizing filters 46A and 46B can be orthogonal to one another, so that the polarizations of the signals that transmit therethrough are orthogonal to one another.

The orthogonal polarized components that emerge from orthogonal receiver channels 26A and 26B are then transmitted to beam splitter 32 via optical delay elements 30A and 30B, respectively. Optical delay elements 30A and 30B are further configured to combine the orthogonal polarized components into a single beam. Combining the orthogonal polarized components can be done by juxtaposing and aligning transmission ends 48A and 48B of optical delay elements 30A and 30B adjacent and parallel to one another. Optical delay elements 30A and 30B can have delay times that are different from one another. For example, a difference between the delay times of optical delay elements 30A and 30B can be greater than a predetermined delay time. For example, the difference between the delay times of optical delay elements 30A and 30B can be equal to or greater than the time that it takes the pulsed beam to project to a predetermined range of detection. In this way, each of the orthogonal polarized components of the combined beam will be separated in time from one another, so as to be individually detectable by a detector.

Beam splitter 32 then splits the orthogonal polarized components into first and second parts. First parts of the orthogonal polarized components are directed to optical detector 26H, and second parts of orthogonal components are directed to optical detector 26L. Optical detectors 26H and 26L are configured to simultaneously detect first and second parts of the orthogonal polarized component of orthogonal receiver channels 26A, respectively, and then a predetermined time later (e.g., corresponding to the difference in the delay times of optical delay elements 30A and 30B) to simultaneously detect first and second parts of the polarized component of orthogonal receiver channels 26A. In this way, both orthogonal polarizations are detected by both high-gain signal detector 36H and low-gain signal detector 36L.

Discussion of Possible Embodiments

The following are non-exclusive descriptions of possible embodiments of the present invention.

Apparatus and associated methods relate to a system for measuring cloud parameters. The system includes a pulsed-beam projector configured to project a pulsed-beam of polarized light into a projection volume of a cloud atmosphere. The system includes a receiver configured to receive a reflected portion of the projected pulsed beam backscattered from within the projection volume of the cloud atmosphere and to filter the received reflected portion into orthogonal polarized components. The system includes a beam splitter aligned with the orthogonal polarized components so as split each of the orthogonal polarized components into first and second parts. The system includes a first detector having a first gain, the first detector aligned with the first parts of the orthogonal polarized components and configured to generate first signals indicative of the first parts of the received reflected portion, respectively. The system also includes a second detector having a second gain, the second detector aligned with the second parts of the orthogonal polarized components and configured to generate second signals indicative of the second parts of the orthogonal polarized components, respectively. A ratio of the first and second gains of the first and second detectors, respectively, is greater than 3.

The system of the preceding paragraph can optionally include, additionally and/or alternatively, any one or more of the following features, configurations and/or additional components:

A further embodiment of the foregoing system can further include a processor configured to determine large water droplet size based on a magnitude of scintillation spikes of the first signals, and to determine water content based on the second signals.

A further embodiment of any of the foregoing systems, wherein the processor can be further configured to determine the water content based only on the first signals if the second signals saturate.

A further embodiment of any of the foregoing systems, wherein the pulsed-beam projector can include a laser configured to generate the pulsed-beam. The pulsed beam projector can include a polarizing plate aligned with the pulsed beam so as to polarize the pulsed beam. The pulsed-beam projector can also include a projection lens aligned with the pulsed beam so as to refract the pulsed beam into the projection volume of the cloud atmosphere.

A further embodiment of any of the foregoing systems, wherein the receiver can include one or more polarizing elements configured to filter the received reflected portion into orthogonal polarized components, one parallel to that of the projected pulsed beam and one orthogonal to the projected pulsed beam.

A further embodiment of any of the foregoing systems, wherein the projected pulsed beam is circularly polarized.

A further embodiment of any of the foregoing systems, wherein the receiver can include a parallel receiver channel configured to receive the polarized component parallel to that of the projected pulsed beam. The parallel receiver channel can include a first optical delay element configured to delay the polarized component parallel to that of the projected pulsed beam by a first delay time. The receiver can include an orthogonal receiver channel configured to receive the polarized component orthogonal to that of the projected pulsed beam. The orthogonal receiver channel can includes a second optical delay element configured to delay the polarized component orthogonal to that of the projected pulsed beam by a second delay time. A difference between the first and second delay times can be greater than the predetermined time.

A further embodiment of any of the foregoing systems, wherein the first and second optical delay elements can include first and second optical fibers, respectively, each having a reception end and a transmission end. The first and second optical fibers can be of first and second predetermined lengths, respectively, thereby resulting in the first and second delay times.

A further embodiment of any of the foregoing systems, wherein the transmission ends of the first and second optical fibers can be aligned adjacent to one another so as to combine and present the orthogonal polarized components to the beam splitter.

A further embodiment of any of the foregoing systems, wherein the received reflected portion can include first and second reflected portions. The parallel receiver channel can further include a first detection lens aligned so as to receive the first reflected portion. The parallel receiver can also include a first polarizing filter configured to transmit the polarized component parallel to that of the projected pulsed beam. The orthogonal receiver can further include a second detection lens aligned so as to receive the second reflected portion of the projected pulsed beam. The orthogonal receiver can also include a second polarizing filter configured to transmit the polarized component orthogonal to that of the projected pulsed beam.

A further embodiment of any of the foregoing systems, wherein the first part of the orthogonal polarized components can include first parts of the orthogonal polarized components and second parts of the orthogonal polarized components.

A further embodiment of any of the foregoing systems, wherein the generated first signal indicative of the first part of the orthogonal polarized components can include a first sub-signal indicative of the first part of the polarized component parallel to that of the projected pulsed beam and a second sub-signal indicative of the first part of the polarized component orthogonal to that of the projected pulsed beam. The generated second signal indicative of the second part of the orthogonal polarized components can include a third sub-signal indicative of the second part of the polarized component parallel to that of the projected pulsed beam and a fourth sub-signal indicative of the second part of the polarized component orthogonal to that of the projected pulsed beam.

Some embodiments relate to a method for measuring cloud parameters. The method includes projecting, via a pulsed-beam projector, a pulsed-beam of polarized light into a projection volume of a cloud atmosphere. The method includes receiving, via a receiver, a reflected portion of the projected pulsed beam backscattered from within the projection volume of the cloud atmosphere. The method includes filtering, via the receiver, the received reflected portion into orthogonal polarized components. The method includes splitting, via a beam splitter aligned with the orthogonal polarized components, each of the orthogonal polarized components into first and second parts. The method includes generating, via a first detector aligned with the first parts of the orthogonal polarized components, first signals indicative of the first parts of the received reflected portion, respectively, wherein the first detector has a first gain. The method also includes generating, via a second detector aligned with the second parts of the orthogonal polarized components, second signals indicative of the second parts of the orthogonal polarized components, respectively, wherein the second detector has a second gain. A ratio of the first and second gains of the first and second detectors, respectively, is greater than 3.

The method of the preceding paragraph can optionally include, additionally and/or alternatively, any one or more of the following features, configurations and/or additional components:

A further embodiment of the foregoing method can further include determining, via a processor, large water droplet size based on a magnitude of scintillation spikes of the first signals. The method can also include determining, via the processor, water content based on the second signals.

A further embodiment of any of the foregoing methods, wherein projecting the pulsed-beam of polarized light into the projection volume of the cloud atmosphere can include generating the pulsed-beam, polarizing the pulsed beam, and refracting the pulsed beam into the projection volume of the cloud atmosphere.

A further embodiment of any of the foregoing methods, wherein the filtered orthogonal polarized components can include a polarized component parallel to the projected pulsed beam, and a polarized component orthogonal to the projected pulsed beam.

A further embodiment of any of the foregoing methods, wherein the projected pulsed beam is circularly polarized.

A further embodiment of any of the foregoing methods can further include delaying, via a first optical delay element, the polarized component parallel to that of the projected pulsed beam by a first delay time. The method can also include delaying, via a second optical delay element, the polarized component orthogonal to that of the projected pulsed beam by a second delay time. A difference between the first and second delay times is greater than the predetermined time.

A further embodiment of any of the foregoing methods can further include combining, via a juxtaposition of the optical delay elements, the orthogonal polarized components. The method can also include presenting the combined orthogonal polarized components to the beam splitter.

Some embodiments relate to a system for measuring cloud parameters. The system includes a laser configured to generate a pulsed-beam of light. The system includes a polarizing plate aligned with the pulsed beam so as to polarize the pulsed beam. The system includes a projection lens aligned with the pulsed beam so as to refract the pulsed beam into a projection volume of a cloud atmosphere. The system includes a first receiver channel having a first detection lens aligned with the projection lens so as to receive a first reflected portion of the projected pulsed beam backscattered from within the projection volume of the cloud atmosphere. The first receiver channel has a first polarizing filter configured to transmit a parallel-polarized component of the received first reflected portion of the projected pulsed beam. The parallel-polarized component has a polarization parallel to that of the projected pulsed beam. The first receiver channel also has a first optical fiber of a first length and configured to transmit the parallel-polarized component from a first end to a second end during the first delay time corresponding to the first length. The system includes a second receiver channel having a second detection lens aligned with the projection lens so as to receive a second reflected portion of the projected pulsed beam backscattered from within the projection volume of the cloud atmosphere. The second receiver channel has a second polarizing filter configured to transmit an orthogonal-polarized component of the received second reflected portion of the projected pulsed beam. The orthogonal-polarized component has a polarization orthogonal to that of the projected pulsed beam. The second receiver channel also has a second optical fiber of a second length and configured to transmit the orthogonal-polarized component from a third end to a fourth end during a second delay time corresponding to the second length. A difference between the first and second delay times is greater than a predetermined duration. The second and fourth ends of the first and second optical fibers, respectively, are aligned so as to direct the transmitted parallel- and orthogonal-polarized components along a single pathway. The system includes a beam splitter aligned with the second and fourth ends of the first and second optical fibers so as to receive the combined parallel- and orthogonal-polarized components and further configured to split the orthogonal-polarized components directed along the single pathway into first and second parts. The system includes a first detector having a first gain and configured to generate a first signal indicative of the first part of the combined beam. The system also includes a second detector having a second gain and configured to generate a second signal indicative of the second part of the combined beam. A ratio of the first and second gains of the first and second detectors, respectively, is greater than 3.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for measuring cloud parameters, the system comprising:
    a pulsed-beam projector configured to project a pulsed-beam of polarized light into a projection volume of a cloud atmosphere;
    a receiver configured to receive a reflected portion of the projected pulsed beam backscattered from within the projection volume of the cloud atmosphere and to filter the received reflected portion into orthogonal polarized components;
    a beam splitter aligned with the orthogonal polarized components so as split each of the orthogonal polarized components into first and second parts;
    a first detector having a first gain, the first detector aligned with the first parts of the orthogonal polarized components and configured to generate first signals indicative of the first parts of the received reflected portion, respectively;
    a second detector having a second gain, the second detector aligned with the second parts of the orthogonal polarized components and configured to generate second signals indicative of the second parts of the orthogonal polarized components, respectively; and a processor configured to determine large water droplet size based on a magnitude of scintillation spikes of the first signals, and to determine water content based on the second signals, wherein a ratio of the first and second gains of the first and second detectors, respectively, is greater than 3.

2. The system of claim 1, wherein the processor is further configured to determine the water content based only on the first signals if the second signals saturate.

3. The system of claim 1, wherein the pulsed-beam projector includes:
a laser configured to generate the pulsed-beam;
a polarizing plate aligned with the pulsed beam so as to polarize the pulsed beam; and
a projection lens aligned with the pulsed beam so as to refract the pulsed beam into the projection volume of the cloud atmosphere.

4. The system of claim 1, wherein the receiver includes:
one or more polarizing elements configured to filter the received reflected portion into orthogonal polarized components, one parallel to that of the projected pulsed beam and one orthogonal to the projected pulsed beam.

5. The system of claim 4, wherein the projected pulsed beam is circularly polarized.

6. The system of claim 4, wherein the receiver includes:
a parallel receiver channel configured to receive the polarized component parallel to that of the projected pulsed beam, wherein the parallel receiver channel includes a first optical delay element configured to delay the polarized component parallel to that of the projected pulsed beam by a first delay time; and
an orthogonal receiver channel configured to receive the polarized component orthogonal to that of the projected pulsed beam, wherein the orthogonal receiver channel includes a second optical delay element configured to delay the polarized component orthogonal to that of the projected pulsed beam by a second delay time,
wherein a difference between the first and second delay times is greater than the predetermined time.

7. The system of claim 6, wherein the first and second optical delay elements comprise first and second optical fibers, respectively, each having a reception end and a transmission end, wherein the first and second optical fibers are of first and second predetermined lengths, respectively, thereby resulting in the first and second delay times.

8. The system of claim 7, wherein the transmission ends of the first and second optical fibers are aligned adjacent to one another so as to combine and present the orthogonal polarized components to the beam splitter.

9. The system of claim 6, wherein the received reflected portion comprises first and second reflected portions, wherein the parallel receiver channel further includes:
a first detection lens aligned so as to receive the first reflected portion; and
a first polarizing filter configured to transmit the polarized component parallel to that of the projected pulsed beam,
wherein the orthogonal receiver channel further includes:
a second detection lens aligned so as to receive the second reflected portion of the projected pulsed beam; and
a second polarizing filter configured to transmit the polarized component orthogonal to that of the projected pulsed beam.

10. The system of claim 9, wherein the first part of the orthogonal polarized components include first parts of the orthogonal polarized components and second parts of the orthogonal polarized components.

11. The system of claim 10, wherein the generated first signal indicative of the first part of the orthogonal polarized components includes a first sub-signal indicative of the first part of the polarized component parallel to that of the projected pulsed beam and a second sub-signal indicative of the first part of the polarized component orthogonal to that of the projected pulsed beam, and wherein the generated second signal indicative of the second part of the orthogonal polarized components includes a third sub-signal indicative of the second part of the polarized component parallel to that of the projected pulsed beam and a fourth sub-signal indicative of the second part of the polarized component orthogonal to that of the projected pulsed beam.

12. A method for measuring cloud parameters, the method comprising:
projecting, via a pulsed-beam projector, a pulsed-beam of polarized light into a projection volume of a cloud atmosphere;
receiving, via a receiver, a reflected portion of the projected pulsed beam backscattered from within the projection volume of the cloud atmosphere;
filtering, via the receiver, the received reflected portion into orthogonal polarized components;
splitting, via a beam splitter aligned with the orthogonal polarized components, each of the orthogonal polarized components into first and second parts;
generating, via a first detector aligned with the first parts of the orthogonal polarized components, first signals indicative of the first parts of the received reflected portion, respectively, wherein the first detector has a first gain;
generating, via a second detector aligned with the second parts of the orthogonal polarized components, second signals indicative of the second parts of the orthogonal polarized components, respectively, wherein the second detector has a second gain;
determining, via a processor, large water droplet size based on a magnitude of scintillation spikes of the first signals; and
determining, via the processor, water content based on the second signals,
wherein a ratio of the first and second gains of the first and second detectors, respectively, is greater than 3.

13. The method of claim 12, wherein projecting the pulsed-beam of polarized light into the projection volume of the cloud atmosphere includes:
generating the pulsed-beam;
polarizing the pulsed beam; and
refracting the pulsed beam into the projection volume of the cloud atmosphere.

14. The system of claim 12, wherein the filtered orthogonal polarized components includes:
a polarized component parallel to the projected pulsed beam; and
a polarized component orthogonal to the projected pulsed beam.

15. The system of claim 13, wherein the projected pulsed beam is circularly polarized.

16. The system of claim 14, further comprising:
delaying, via a first optical delay element, the polarized component parallel to that of the projected pulsed beam by a first delay time; and
delaying, via a second optical delay element, the polarized component orthogonal to that of the projected pulsed beam by a second delay time, wherein a difference between the first and second delay times is greater than the predetermined time.

17. The system of claim 16, further comprising:
combining, via a juxtaposition of the optical delay elements, the orthogonal polarized components; and
presenting the combined orthogonal polarized components to the beam splitter.

18. A system for measuring cloud parameters, the system comprising:
a laser configured to generate a pulsed-beam of light;
a polarizing plate aligned with the pulsed beam so as to polarize the pulsed beam;
a projection lens aligned with the pulsed beam so as to refract the pulsed beam into a projection volume of a cloud atmosphere;
a first receiver channel including:
    a first detection lens aligned with the projection lens so as to receive a first reflected portion of the projected pulsed beam backscattered from within the projection volume of the cloud atmosphere;
    a first polarizing filter configured to transmit a parallel-polarized component of the received first reflected portion of the projected pulsed beam, the parallel-polarized component having a polarization parallel to that of the projected pulsed beam; and
    a first optical fiber of a first length and configured to transmit the parallel-polarized component from a first end to a second end during the first delay time corresponding to the first length; and
a second receiver channel including:
    a second detection lens aligned with the projection lens so as to receive a second reflected portion of the projected pulsed beam backscattered from within the projection volume of the cloud atmosphere;
    a second polarizing filter configured to transmit an orthogonal-polarized component of the received second reflected portion of the projected pulsed beam, the orthogonal-polarized component having a polarization orthogonal to that of the projected pulsed beam; and
    a second optical fiber of a second length and configured to transmit the orthogonal-polarized component from a third end to a fourth end during a second delay time corresponding to the second length,
    wherein a difference between the first and second delay times is greater than a predetermined duration,
    wherein the second and fourth ends of the first and second optical fibers, respectively, are aligned so as to direct the transmitted parallel- and orthogonal-polarized components along a single pathway, and
a beam splitter aligned with the second and fourth ends of the first and second optical fibers so as to receive the combined parallel- and orthogonal-polarized components and further configured to split the orthogonal-polarized components directed along the single pathway into first and second parts;
a first detector having a first gain and configured to generate a first signal indicative of the first part of the combined beam; and
a second detector having a second gain and configured to generate a second signal indicative of the second part of the combined beam,
wherein a ratio of the first and second gains of the first and second detectors, respectively, is greater than 3.

* * * * *